(12) United States Patent
Uhlendorf et al.

(10) Patent No.: US 11,009,722 B2
(45) Date of Patent: May 18, 2021

(54) CONTACT LENS FOR USE WITH AN HMD AND ASSOCIATED HMD

(71) Applicant: JABIL OPTICS GERMANY GMBH, Jena (DE)

(72) Inventors: Kristina Uhlendorf, Jena (DE); Mojmir Havlik, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 296 days.

(21) Appl. No.: 16/149,208

(22) Filed: Oct. 2, 2018

(65) Prior Publication Data
US 2019/0107735 A1 Apr. 11, 2019

(30) Foreign Application Priority Data
Oct. 9, 2017 (DE) .......................... 102017123323.7

(51) Int. Cl.
*G02C 7/04* (2006.01)
*G02B 27/01* (2006.01)

(52) U.S. Cl.
CPC .......... *G02C 7/041* (2013.01); *G02B 27/0172* (2013.01); *G02B 2027/0138* (2013.01); *G02C 2202/20* (2013.01)

(58) Field of Classification Search
CPC .... G02C 7/041; G02C 2202/20; G02C 7/081; G02C 7/083; G02C 7/085; G02B 27/0172; G02B 2027/0138
See application file for complete search history.

(56) References Cited

U.S. PATENT DOCUMENTS

| 3,794,414 | A | 2/1974 | Wesley | |
|---|---|---|---|---|
| 4,637,697 | A | 1/1987 | Freeman | |
| 6,874,888 | B1 | 4/2005 | Dudai | |
| 10,092,177 | B1* | 10/2018 | Park | ............ A61B 3/1015 |
| 2003/0210377 | A1* | 11/2003 | Blum | ............ G02C 7/101 351/159.4 |

(Continued)

FOREIGN PATENT DOCUMENTS

WO 2016025443 A1 2/2016

*Primary Examiner* — Collin X Beatty
(74) *Attorney, Agent, or Firm* — Young Basile Hanlon & MacFarlane, P.C.

(57) ABSTRACT

The invention relates to a contact lens for a head-mounted display, HMD, comprising a lens body configured for application to the surface of a contact lens wearer's eye, wherein the lens body has a central optically transparent region, wherein the optically transparent region is composed of a plurality of concentric rings of increasing diameter, wherein in the radial direction each concentric ring is configured either as a Fresnel zone or as a simple lens portion, wherein Fresnel zones and simple lens portions alternate with one another, wherein the Fresnel zones are configured for sharp retinal imaging of image data presented at a fixed distance in front of the surface of the eye, wherein the simple lens portions are configured for sharp retinal imaging of the distance and near vision zones of the contact lens wearer. The invention further relates to an HMD, in which a contact lens according to the invention is used for visualization of variable image data presented in a display at a fixed distance in front of the surface of the eye.

5 Claims, 2 Drawing Sheets

(56) References Cited

U.S. PATENT DOCUMENTS

2005/0187622 A1* 8/2005 Sandstedt ............. A61F 2/1624
                                                    623/6.22
2010/0149618 A1   6/2010 Sprague
2016/0313572 A1* 10/2016 Haddock .............. G02B 5/1895
2017/0007456 A1*  1/2017 Akturk .................. G02C 7/041

* cited by examiner

CONTACT LENS FOR USE WITH AN HMD AND ASSOCIATED HMD

CROSS REFERENCE TO RELATED APPLICATION

This application claims the benefit of German Application No. 10 2017 123 323.7 filed on Oct. 9, 2017, which is incorporated herein by reference as if fully set forth.

FIELD OF INVENTION

The present invention relates to a contact lens for use with a Head-Mounted Display (HMD) and an associated HMD, in particular an HMD with a transparent display, it being possible to perceive the data displayed on the display using the contact lens specifically adapted to the HMD.

BACKGROUND

A head-mounted display (HMD) comprises a display device fastened to the head of a wearer for presenting visual image data. The data are in this respect generally displayed on one or more displays and may be perceived by the wearer with one or both eyes. Often, HMD systems also allow simultaneous observation of the wearer's surroundings, such display devices being particularly suitable in particular for applications in the field of augmented reality. A distinction is drawn in the case of the displays between (semi-)transparent systems ("see-through" HMDs) and those with non-transparent displays. While in the former case variable image data may be directly overlaid on a light field transmitted by the display, in the case of a non-transparent display all the data have to be presented wholly by the display. To present the surroundings, it may therefore be necessary to capture the surroundings additionally using a camera, for example a real-time camera integrated into the HMD.

In order to enable coverage as far as possible over the entire range of vision of a wearer when data are presented via the display, a particularly large angle of view is needed. The problem arises here, however, that the human eye cannot simultaneously see sharply at distance ("distance vision zone" from around 2 m away from the eye or the surface of the eye), close up ("near vision zone" from around 0.25 m to around 0.5 m) and/or in the region in between ("intermediate zone" from around 0.5 m to around 2 m). Due to the relatively small distance between an HMD display and a viewer's eye, the eye's lens has therefore constantly to adapt to the viewer's changing focus. This may be very strenuous and tiring for HMD wearers due to the constant changes in muscle tone, in particular of the ciliary muscles. The display should also preferably be arranged at a short distance in front of the surface of the eye. Due to a naturally predetermined minimum distance for sharp vision, however, a lower limit typically applies to any reduction in the distance.

To achieve sharp retinal imaging of an object both in the distance and close to (the intermediate zone will not be specifically mentioned hereinafter and always be assumed to be included), additional optical elements may be used. The minimum structural size of a conventional HMD is determined by the distance between the optical element and the eye and the desired angle of view (relative to the chief ray). In this case, the optical element (for example goggles) should for ergonomic reasons be positioned no closer than 25 mm in front of the eye (or the surface of the eye). Due to this property, it is difficult to achieve large angles of view using the approach typically taken hitherto (optical function in goggles achieved by refractive or diffractive areas). The goggles required are then generally very large and heavy or undesired image field distortions (for example tilting) occur.

In contrast, contact lenses are optical elements which may be used very close to the eye for the implementation of optical concepts. Contact lenses are a possible alternative to goggles due to their great ease of manufacture, major flexibility in the implementation of desired optical properties and the possibility of their being used discreetly, in such a way as to be difficult for outside observers to detect. In this respect, the possibility of being able to wear a contact lens permanently in the eye for a whole day at a time provides a major advantage over goggles. Contact lenses are suitable both for focus correction and also for implementing a plurality of further optical functionalities. U.S. Pat. No. 6,874,888 B1 discloses a polarizing contact lens with a clear peripheral zone.

The object of the invention is therefore to provide an improved HMD system for display applications which avoids or at least markedly reduces one or more of the problems outlined in the prior art. One object of the invention is in particular to provide a contact lens for use with an HMD and an associated HMD, in particular an HMD with a transparent display, it being possible to perceive the data displayed on the display using the contact lens specifically adapted to the HMD.

SUMMARY

The above-mentioned objects are achieved with the assistance of the devices according to the invention according to claims 1 through 5.

One aspect of the invention relates to a contact lens for a head-mounted display (HMD) comprising a lens body configured for application to the surface of a contact lens wearer's eye, the lens body having a central optically transparent region, the optically transparent region being composed of a plurality of concentric rings of increasing diameter, wherein in the radial direction each concentric ring is configured either as a Fresnel zone or as a simple lens portion, wherein Fresnel zones and simple lens portions alternate with one another, wherein the Fresnel zones are configured for sharp retinal imaging of image data presented at a fixed distance in front of the surface of the eye, wherein the simple lens portions are configured for sharp retinal imaging of the distance and near vision zones of the contact lens wearer.

A contact lens may preferably be a dimensionally stable ("hard") or a flexible ("soft") contact lens. The lens body preferably consists of a biocompatible, oxygen permeable material. A contact lens according to the invention comprises an optically transparent region at least in the middle of the lens. Within this region, non-zero light transmission through the lens proceeds at least in a spectral window of the overall visible region of the spectrum.

The optically transparent region is composed, according to the invention, of a plurality of concentric rings of increasing diameter. Successive rings may here differ both in their optical function (preferred visual range) and in their structural make-up. In this case, each concentric ring is configured either as a Fresnel zone or as a simple lens portion along any desired radial direction thereof, wherein Fresnel zones and simple lens portions alternate with one another (zoning). The innermost ring corresponds in this respect to a full circle encompassing the center of the lens, i.e. a ring with a tiny internal diameter. The first, innermost ring preferably takes the form of a simple lens portion. In this way, retinal imaging of objects in the contact lens wearer's distance and near vision zones proceeds at least in part via the center of the contact lens. Alternatively, the lens center may also take the form of a Fresnel zone.

The Fresnel zones are configured for sharp retinal imaging of image data presented at a fixed distance, preferably in the region between 5 cm and 1 mm, more preferably in the region between 1 mm and 1 m, in front of the surface of the eye. The simple lens portions may be conventionally patterned curved surface regions, as used in particular in the field of optometry. The simple lens portions are configured according to the invention for sharp retinal imaging of the contact lens wearer's distance and near vision regions, i.e. of objects in these regions. For a normal-sighted contact lens wearer, there is therefore no need for refractive power correction.

In particular, a contact lens according to the invention is thus a bi- or multifocal contact lens, wherein at least one focal length for is provided for "normal" vision, i.e. for corrected or uncorrected generation of a sharp retinal image of objects in the wearer's distance and near vision zone, and a second focal length for focusing for example on a display, goggles or indeed the windshield of a vehicle for a head-up display (HUD). In contrast with a conventional bifocal contact lens or a multifocal progressive contact lens, which are primarily used to correct presbyopia, it is possible due to the fixed distance from the image data presented to achieve a more specific configuration of the optical characteristics required for this purpose. In particular, sharp retinal imaging of image data presented at a fixed distance in front of the surface of the eye is largely independent of the current accommodation of the contact lens wearer's eye wearing the contact lens, such that the image data may be continuously detected without additional strain on the eye's ciliary muscles. In particular, markedly more relaxed vision may be achieved in particular in combination with an HMD system. In addition, a contact lens according to the invention may optometrically correct vision defects.

Regions configured as Fresnel zones are particularly preferred for sharp retinal imaging of image data presented at the fixed distance in front of the surface of the eye since, in the case of optical elements based on Fresnel zones, refractive power and imaging behavior can be adjusted over a wide range involving little effort and materials usage. The basic shape of a normal contact lens can in this respect be substantially retained, whereby established production processes are applicable. Fresnel zones may in particular be applied to a specific basic lens shape as clear patterned elements or be integrated thereinto, e.g. by means of subsequent laser or material machining.

A further aspect of the invention relates to a head-mounted display (HMD) comprising a semi-transparent display configured to overlay variable image data on a transmitted light field, a mount for the display, wherein the display may be arranged at a fixed distance in front of at least one eye of an HMD wearer, and a contact lens according to the invention, which is configured to be applied to the surface of an HMD wearer's eye associated with the display, wherein the Fresnel zones of the contact lens are configured for sharp retinal imaging of the variable image data of the semi-transparent display and the simple lens portions are configured for sharp retinal imaging of the light field transmitted by the semi-transparent transmitted light field in the distance and near vision zones of an HMD wearer.

The mount may preferably take the form of goggles. The goggles and/or the display may be flat or curved, wherein a curvature adapted to the general human facial shape delivers better image quality due to the constant distance of the individual surface elements of the display from the surface of the eye. On the other hand, a flat embodiment has the advantage that standard components can be used to the greatest possible extent in manufacture. It is preferable for the holder to be fastened to or mounted on at least one half of the face using a frame.

The semi-transparent display of a HMD according to the invention may in particular be an LCD display or a TFT display. The semi-transparent display is preferably an OLED display. A luminescent OLED display here in particular offers the advantage that the superimposition of image data may take place even in complete darkness. Additional external lighting is not needed for the display.

The invention is based on the recognition that contact lenses are optical elements which can be used very close to a wearer's eye to implement optical concepts. A contact lens for use with an HMD and an associated HMD, in particular an HMD with a transparent display, it being possible to perceive the data displayed on the display by means of the contact lens specifically adapted to the HMD, allows a low-weight, compact, robust and simple embodiment of optical display applications for HMD or HUD. In particular, a contact lens according to the invention may also be worn inconspicuously in the eye without associated HMD or HUD. The optical element cannot therefore be unintentionally mislaid or lost when the display is not being used. In addition, the contact lens may bring about an improvement in the wearer's vision.

One preferred configuration of the invention provides for the optically transparent region of the contact lens to be divided in two along a straight line through the center of the ring, wherein in the first semicircle the first half-ring takes the form of a Fresnel zone and in the second semicircle the first half ring takes the form of a simple lens portion. Such an arrangement is particularly advantageous since changes in the pupil diameter of the respective contact lens wearer may arise depending on ambient brightness or the respectively prevailing light conditions. The range of adjustment of the human pupil diameter is between about 2 mm in full sunlight and about 8 mm in complete darkness. Accordingly, in the case of an optical element configured according to the invention as a contact lens with concentric rings, a different number of ring zones contributes to image formation on the retina depending on brightness or incident light. Depending on the size and number of the individual rings, image quality may in particular suffer as a result or only part of the data is detected (e.g. only the image data of the display) or the image data of the display cannot be detected at all or only with considerable effort. In addition, the sharpest imaging takes place in the main over the region in the center of the lens, whereby given visual ranges may be prioritized specifically in bright conditions.

In a configuration divided according to the invention of the optically transparent region of the contact lens, the first half ring configured in the first semicircle as a Fresnel zone consequently allows preferred sharp retinal imaging of image data presented at the fixed distance in front of the surface of the eye, while the first half ring configured in the second semicircle as a simple lens portion offers preferred sharp retinal imaging of the distance and near vision zones. In low light environments, the visibility of image data presented at the fixed distance in front of the surface of the eye may be increased over distance and near zone vision, while in bright environments distance and near zone vision preferably proceeds via the lens center. The division into two may thus ensure visibility of image data presented at a fixed distance in front of the surface of the eye even under difficult light conditions and for all pupil diameters. In this respect, it may be ensured by way of the individual ring diameters that at least two rings may contribute to image formation under all conditions. It is particularly preferable for the diameter of the first ring to be less than 1 mm.

The optically transparent region is preferably configured to correct imaging errors or for eliminating refractive errors (ametropy) in the eye of the contact lens wearer. Correction may in this case proceed in particular with regard to existing short- or long-sightedness or to compensate for astigmatism. An additional optical functionality may thereby be integrated into the contact lens for the contact lens wearer. For short- or long-sighted contact lens wearers, corresponding refractive power correction may be performed in the simple lens portions. Configuration of the simple lens portions may also allow the necessary correction of further imaging errors by the eyes, insofar as this might be needed by a specific wearer for sharp retinal imaging.

The focal length of a contact lens according to the invention is preferably electrically adjustable. This may proceed for example by means of an electrically controllable liquid lens or by means of electrostatic adjustment. Dynamic adaptation of focal length allows further optical functionalities to be integrated into the contact lens. Above all, however, accommodation of the wearer's eye can be compensated.

The semi-transparent display of an HMD according to the invention preferably comprises an electrochromic layer. Such a layer in particular allows the contrast between the display and the surroundings to be controlled as required as a function of ambient brightness. The electrochromic layer may be used for closed-loop control of the transmittance of the display.

An HMD according to the invention preferably further comprises a camera, wherein the camera is configured to detect the field of view observed by the wearer of the HMD. The camera may be integrated into the mount of the HMD. It is in particular preferable for the field of view of the camera to encompass the entire field of view of the HMD wearer. In this way, first of all the wearer's surroundings may be evaluated and then further processed into augmented reality.

An HMD according to the invention preferably comprises a means for gesture recognition. This means may for example perform the motion detection necessary for gesture recognition using a position sensor or electronic motion recognition based on pattern detection within a camera image. If specific predefined or freely determined motion patterns (gestures) are identified by the gesture recognition means, these may be used to control the HMD. In this way, any desired interactions with the HMD system may be performed without an additional conventional input device being needed for this purpose.

Further preferred configurations of the invention are moreover revealed by the further features mentioned in the individual subclaims. The various embodiments of the invention mentioned in this application may advantageously be combined together, provided it is not stated otherwise with regard to an individual case. In this respect, both the above general summary and the following detailed description may be regarded as examples and serve in explaining the claimed invention. Further advantages and features of the invention are apparent from the following description, the drawings and the claims.

BRIEF DESCRIPTION OF THE DRAWINGS

The invention is explained below with reference to exemplary embodiments and on the basis of the accompanying drawings, in which.

DETAILED DESCRIPTION OF THE PREFERRED EMBODIMENTS

Figure 1:
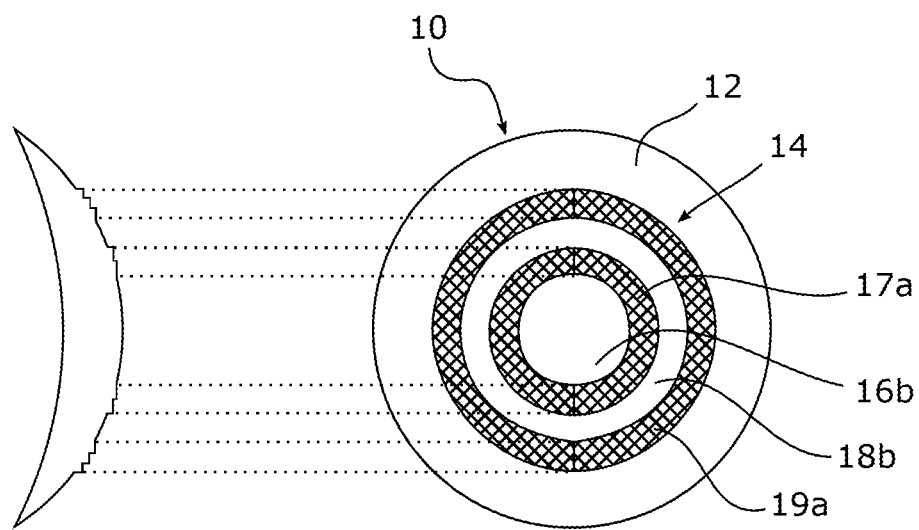
FIG. 1 is a schematic depiction of a first embodiment of a contact lens according to the invention, in plan view and cross-sectional view.

FIG. 1 is a schematic depiction of a first embodiment of a contact lens 10 according to the invention, in plan view and in cross-sectional view. The contact lens 10 depicted is particularly suitable for use for an HMD 20 and has a lens body 12 which is configured to be applied to the surface of a contact lens wearer's eye. The lens body 12 has a central optically transparent region 14, wherein the optically transparent region 14 is composed of a plurality of concentric rings 16, 17, 18, 19 of increasing diameter. In the radial direction, each concentric ring 16, 17, 18, 19 is configured either as a Fresnel zone 16a, 17a, 18a, 19a or as a simple lens portion 16b, 17b, 18b, 19b, wherein Fresnel zones 16a, 17a, 18a, 19a and simple lens portions 16b, 17b, 18b, 19b alternate with one another. The Fresnel zones 16a, 17a, 18a, 19a are configured for sharp retinal imaging of image data presented at a fixed distance in front of the surface of the eye, for example on a display of an HMD or an HUD. The simple lens portions 16b, 17b, 18b, 19b are configured for sharp retinal imaging of the contact lens wearer's distance and near vision zones, i.e. of objects located in the distance or near vision zone (including the intermediate zone). As is clear from the cross-sectional view, Fresnel zones 16a, 17a, 18a, 19a and simple lens portions 16b, 17b, 18b, 19b adjoin one another or alternate.

The depiction of the Fresnel zones 16a, 17a, 18a, 19a as superficially patterned regions of the lens body 12 is here selected merely by way of example for illustrative purposes. In particular, it is not intended that the nature of the Fresnel zones used should be limited in any way thereby. The Fresnel zones 16a, 17a, 18a, 19a depicted may for example also be buried in the lens body 12 under a cover layer or patterned otherwise than at the lens surface. In the contact lens shown, the first, innermost ring 16 is a full circle encompassing the center of the lens and configured as a simple lens portion 16b. Alternatively, the first, innermost ring 16 may also be a full circle encompassing the lens center and configured as a Fresnel zone 16a.

Figure 2:
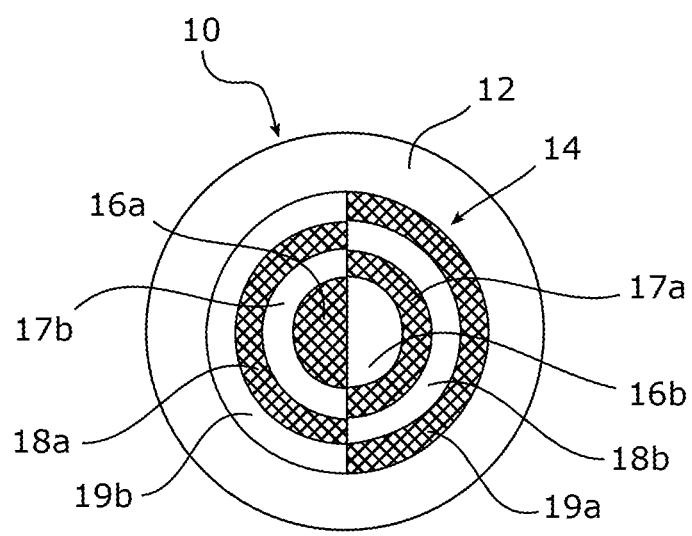
FIG. 2 is a schematic depiction of a second embodiment of a contact lens according to the invention, in plan view.

FIG. 2 is a schematic depiction of a second embodiment of a contact lens 10 according to the invention in plan view. The depiction substantially corresponds to the arrangement shown in FIG. 1. The respective reference signs apply accordingly. Unlike in FIG. 1, the optically transparent region 14 of the contact lens 10 is divided in two along a straight line through the (concentric) ring center, wherein in the first semicircle the first, innermost half ring takes the form of a Fresnel zone 16a and in the second semicircle the first, innermost half ring takes the form of a simple lens portion 16*b*. This corresponds to a combination of the latter two alternatives mentioned in the description relating to FIG. 1.

Figure 3:
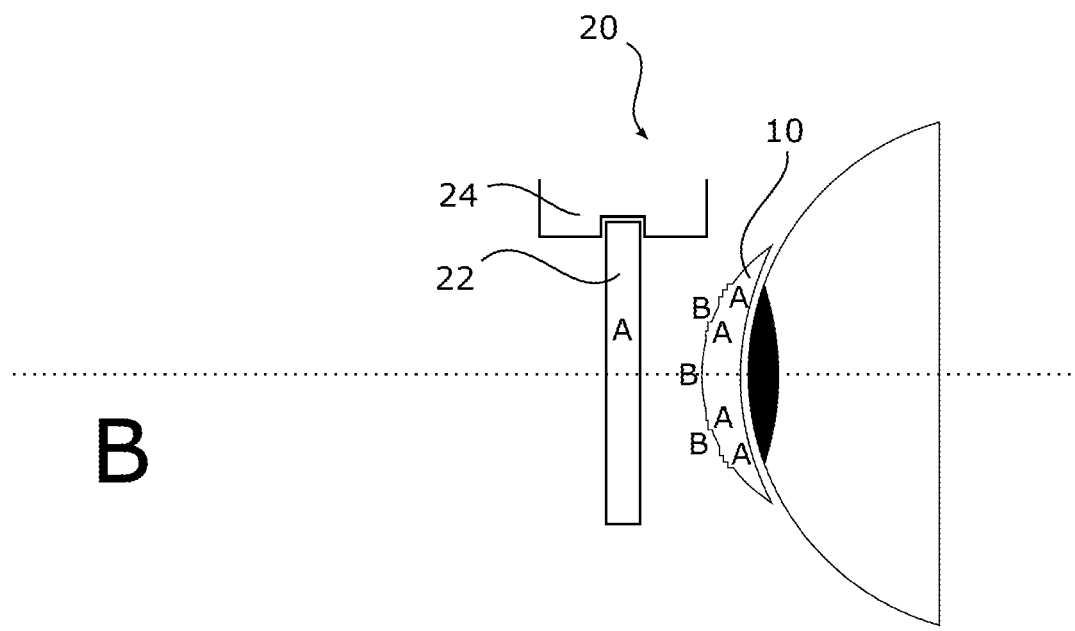
FIG. 3 is a schematic depiction of an embodiment of an HMD according to the invention.

FIG. 3 is a schematic depiction of an embodiment of an HMD 20 according to the invention. The HMD 20 shown comprises a semi-transparent display 22, which is configured to overlay variable image data on a transmitted light field (the image data are designated with the letter "A"), a mount 24 for the display 22, wherein the display 22 is arranged at a fixed distance in front of at least one eye of an HMD wearer, and a contact lens 10 according to the invention, for example embodied as shown in FIG. 1, wherein the contact lens 10 is applied to the surface of an HMD wearer's eye associated with the display 24. The Fresnel zones 16*a*, 17*a*, 18*a*, 19*a* of the contact lens 10 are configured for sharp retinal imaging of variable image data (letter "A") of the semi-transparent display 22. The simple lens portions 16*b*, 17*b*, 18*b*, 19*b* are configured for sharp retinal imaging of the light field transmitted by the semi-transparent display 22 in the distance and near vision zones of an HMD wearer, i.e. of objects located in the distance or near vision zone (including intermediate zone) (here designated by way of example by letter "B"). The letter arrangement shown in the region of the contact lens 10 here indicates which regions of the lens body 12 contribute to the respective image formation ("A" or "B") on the retina. It is clear from the depiction that just two rings 16, 17 contributing completely to image formation enable both sharp retinal imaging of the variable image data ("A") of the semi-transparent display 22 and sharp retinal imaging of the light field transmitted by the semi-transparent display 22 in the distance and near vision zones of an HMD wearer, i.e. of objects ("B") located in the distance or near vision zones (including intermediate region).

What is claimed is:

1. A head-mounted display (HMD) comprising:
a semi-transparent display configured to overlay variable image data on a transmitted light field;
a mount for the display, wherein the display is arranged at a fixed distance in front of at least one eye of an HMD wearer; and
a contact lens including a lens body configured for application to the surface of a contact lens wearer's eye, the lens body having a central optically transparent region, the optically transparent region being composed of a plurality of concentric rings of increasing diameter, wherein in the radial direction each concentric ring is configured either as a Fresnel zone or as a simple lens portion, wherein Fresnel zones and simple lens portions alternate with one another, the contact lens configured for application to the surface of an HMD wearer's eye associated with the display,
wherein the Fresnel zones of the contact lens are configured for sharp retinal imaging of the variable image data of the semi-transparent display and the simple lens portions are configured for sharp retinal imaging of the light field transmitted by the semi-transparent display in the distance and near vision zones of an HMD wearer.

2. The HMD of claim 1, wherein the semi-transparent display is an OLED display.

3. The HMD of claim 1, wherein the semi-transparent display comprises an electrochromic layer.

4. The HMD of claim 1, wherein the HMD further comprises a camera, wherein the camera is configured to detect the field of view observed by the HMD wearer.

5. The HMD of claim 1, further comprising a means for gesture recognition.

* * * * *